United States Patent
Grissen et al.

(10) Patent No.: US 10,671,714 B2
(45) Date of Patent: Jun. 2, 2020

(54) METHODS AND SYSTEMS FOR ENSURING THAT AN INDIVIDUAL IS AUTHORIZED TO CONDUCT AN ACTIVITY

(71) Applicant: DAON HOLDINGS LIMITED, George Town (KY)

(72) Inventors: Thomas Grissen, Reston, VA (US); Michael Peirce, Dublin (IE); Richard Jay Langley, Vienna, VA (US); Jason Chris Beloncik, South Riding, VA (US); Mark Thomas Kane, Dublin (IE)

(73) Assignee: DAON HOLDINGS LIMITED, West Bay (KY)

( * ) Notice: Subject to any disclaimer, the term of this patent is extended or adjusted under 35 U.S.C. 154(b) by 0 days.

(21) Appl. No.: 16/120,527

(22) Filed: Sep. 4, 2018

(65) Prior Publication Data
US 2019/0073461 A1 Mar. 7, 2019

Related U.S. Application Data

(63) Continuation of application No. 15/437,089, filed on Feb. 20, 2017, now Pat. No. 10,095,853, which is a
(Continued)

(51) Int. Cl.
*G06F 21/32* (2013.01)
*H04L 29/06* (2006.01)
(Continued)

(52) U.S. Cl.
CPC .............. *G06F 21/32* (2013.01); *G06F 21/30* (2013.01); *G06Q 10/02* (2013.01); *G06Q 10/06* (2013.01); *G06Q 10/063114* (2013.01); *G06Q 50/265* (2013.01); *G06Q 50/30* (2013.01); *G07C 9/37* (2020.01); *H04L 9/3231* (2013.01);
(Continued)

(58) Field of Classification Search
CPC ....... H04L 63/102; H04L 63/08; G06F 21/30; G06Q 50/30; G06Q 10/063114; G06Q 10/02; G06Q 10/06; G08G 1/202; G08G 1/123; G08G 1/20; G07B 13/00; H04W 12/06
See application file for complete search history.

(56) References Cited

U.S. PATENT DOCUMENTS

2004/0232220 A1* 11/2004 Beenau .................. G01D 21/00
235/380
2004/0255297 A1* 12/2004 Horstemeyer ........ B60R 25/102
718/100

(Continued)

*Primary Examiner* — Theodore C Parsons
(74) *Attorney, Agent, or Firm* — Kevin McDermott, Esq.

(57) ABSTRACT

A method for ensuring that an individual is authorized to conduct an activity is provided. The method includes conducting, using a processor, an authentication transaction with authentication data captured from an individual desiring to conduct an activity, and determining whether the captured authentication data is legitimate when the individual is successfully authenticated. Moreover, the method includes determining the individual is authorized to conduct the activity when the captured authentication data is legitimate, and conducting, using the processor, a subsequent authentication transaction with authentication data captured from the individual at a subsequent time.

18 Claims, 6 Drawing Sheets

Related U.S. Application Data continuation of application No. 14/722,732, filed on May 27, 2015, now Pat. No. 9,613,199.

(51) Int. Cl.

| | | |
|---|---|---|
| *G06Q 10/06* | (2012.01) | |
| *G06F 21/30* | (2013.01) | |
| *G06Q 10/02* | (2012.01) | |
| *H04L 9/32* | (2006.01) | |
| *H04W 12/06* | (2009.01) | |
| *G07C 9/37* | (2020.01) | |
| *G06Q 50/30* | (2012.01) | |
| *G06Q 50/26* | (2012.01) | |
| *H04W 12/00* | (2009.01) | |

(52) U.S. Cl.
CPC .......... *H04L 63/08* (2013.01); *H04L 63/0861* (2013.01); *H04W 12/06* (2013.01); *H04L 2209/84* (2013.01); *H04L 2463/082* (2013.01); *H04W 12/00503* (2019.01)

(56) References Cited

U.S. PATENT DOCUMENTS

| | | | | |
|---|---|---|---|---|
| 2008/0252412 | A1* | 10/2008 | Larsson | B60R 25/25 340/5.2 |
| 2008/0270019 | A1* | 10/2008 | Anderson | G01C 21/3438 701/533 |
| 2012/0253607 | A1* | 10/2012 | Choi | B60R 25/25 701/49 |
| 2014/0337930 | A1* | 11/2014 | Hoyos | H04L 63/10 726/4 |
| 2015/0228004 | A1* | 8/2015 | Bednarek | G06Q 30/0633 705/26.8 |

* cited by examiner

METHODS AND SYSTEMS FOR ENSURING THAT AN INDIVIDUAL IS AUTHORIZED TO CONDUCT AN ACTIVITY

CROSS-REFERENCE TO RELATED APPLICATIONS

This is a continuation application of U.S. patent application Ser. No. 15/437,089, filed Feb. 20, 2017, which is a continuation application of U.S. patent application Ser. No. 14/722,732, filed May 27, 2015, now U.S. Pat. No. 9,613,199, issued Apr. 4, 2017, the disclosures of which are incorporated herein by reference.

BACKGROUND OF THE INVENTION

This invention relates generally to identifying individuals, and more particularly, to methods and systems for ensuring that an individual is authorized to conduct an activity.

People conduct many different types of activities such as renting homes, staying at hotels and signing-into and out of work. Sometimes people are required to verify their identity prior to conducting an activity. It is known that when checking-in hotel operators typically check to ensure the identification of a guest matches reservation information. Likewise, home owners typically conduct background checks of potential renters and check that the identity of a renter matches the identification of the individual whose background was checked.

Some employees are required to sign-in and out of work using a time clock which prints arrival and departing times on a paper time card. More recently, business models have developed in which employees remotely sign-in and out using their smart devices. For example, ride sharing services permit drivers to remotely sign-in and out when starting and ending a shift. Due to customer safety concerns, ride sharing services typically subject driver applicants to a thorough background check. Applicants who pass the background check may be authorized as drivers while those who do not pass are not authorized. Ride sharing services also subject vehicles to a thorough inspection prior to approving use of a vehicle. Vehicles that pass the inspection may be used as vehicles in the ride sharing service.

Although individuals may remotely sign-in before starting an activity, individuals typically are not required to sign-in after starting the activity. Some authorized individuals, after signing-in, have been known to collude with unauthorized individuals such that an unauthorized individual conducts an activity instead of an authorized individual. Such collusion may result in individuals who are possibly dangerous, or lack the proper temperament for conducting an activity, endangering others. Similar types of collusion may result in unknown individuals damaging vacation rentals or hotel rooms, and/or increasing the danger to other hotel patrons or renters. Such dangers may increase legal liability for individuals and businesses hosting activities as well as damage their reputations which causes reduced business and increases expenses to recapture lost business.

BRIEF DESCRIPTION OF THE INVENTION

In one aspect, a method for ensuring that an individual is authorized to conduct an activity is provided. The method includes conducting, using a processor, an authentication transaction with authentication data captured from an individual desiring to conduct an activity, and determining whether the captured authentication data is legitimate when the individual is successfully authenticated. Moreover, the method includes determining the individual is authorized to conduct the activity when the captured authentication data is legitimate, and conducting, using the processor, a subsequent authentication transaction with authentication data captured from the individual at a subsequent time.

In another aspect, a computer system for ensuring that an individual is authorized to conduct an activity is provided that includes a processor and a memory. The memory is configured to store data about individuals in data records. The computer system is associated with a network and the memory is coupled to the processor and has instructions stored thereon which, when executed by the processor, cause the processor to perform steps including conducting an authentication transaction with authentication data captured from an individual desiring to conduct an activity. Moreover, the instructions when executed by the processor cause the processor to perform steps including determining whether the captured authentication data is legitimate when the individual is successfully authenticated, and determining the individual is authorized to conduct the activity when the captured authentication data is legitimate. Furthermore, the instructions when executed by the processor cause the processor to perform steps including conducting a subsequent authentication transaction with authentication data captured from the individual at a subsequent time.

In yet another aspect, a method for ensuring that an individual is authorized to conduct an activity is provided that includes determining whether authentication data captured from an individual matches corresponding record data of the individual. The authentication data is captured by a terminal device from an individual desiring to conduct an activity, the terminal device is operated by a ride sharing service customer, and the activity comprises driving a ride sharing service vehicle. Moreover, the method includes determining whether the captured authentication data is legitimate when the captured and record data match. Furthermore, the method includes determining the individual is authorized to conduct the activity when the captured authentication data is legitimate and notifying the customer that the individual is authorized to conduct the activity.

DETAILED DESCRIPTION OF THE INVENTION

Figure 1:
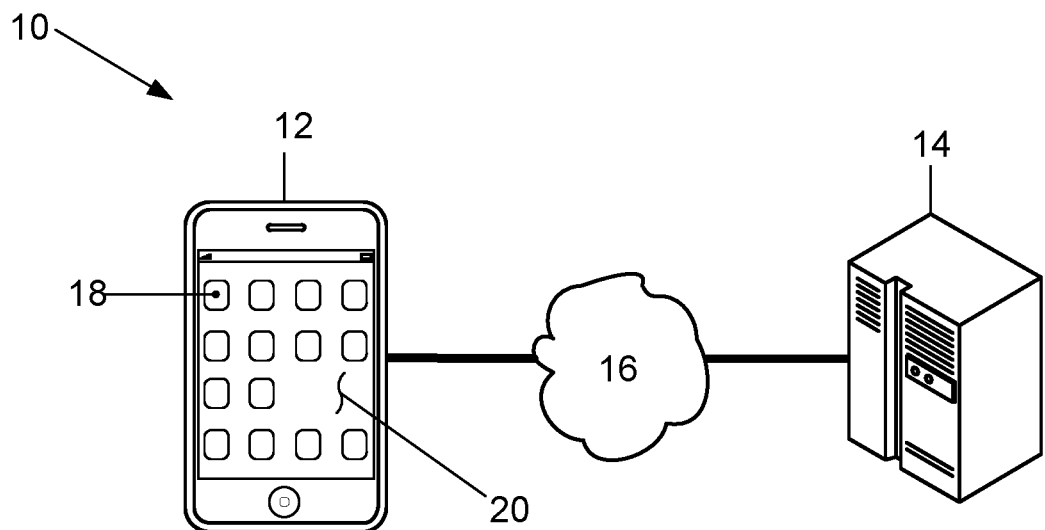
FIG. 1 is a diagram of an exemplary embodiment of an Activity Authentication Computer (AAC) system used to ensure that an individual is authorized to conduct an activity.

FIG. 1 is a diagram of an exemplary embodiment of an Activity Authentication Computer (AAC) System 10 used to ensure that an individual is authorized to conduct an activity. More specifically, the AAC system 10 includes a Terminal Device 12 and an Authentication Computer (AC) System 14 that communicate over a network 16.

The terminal device 12 is a smart phone that may store applications therein, display text and images, and capture and process authentication data. Alternatively, the terminal device 12 may be any device capable of displaying text and images, and capturing, processing, and transmitting data. Such other devices include, but are not limited to, a portable cellular phone, a tablet computer, a phablet computer, a laptop computer, any type of portable communications device having wireless capabilities such as a personal digital assistant (PDA), and a personal computer.

The terminal device 12 may capture authentication data from individuals and transmit it to the AC system 14. Alternatively, the terminal device 12 may process the captured authentication data prior to transmitting it to the AC system 14. For example, the terminal device 12 may capture biometric authentication data, create a biometric template from the captured data, and then transmit the biometric template to the AC system 14.

During authentication transactions, the AC system 14 performs matching of any feature or information associated with individuals to authenticate the identity of individuals. The AC system 14 may also store at least authentication data for individuals in data records. The authentication data may be any kind of information that may be used to authenticate individuals such as, but not limited to pass phrases and biometric data. Moreover, the authentication data may be random codes with any number of digits that may be recited during authentication transactions. The data records include data such as, but not limited to, biometric data, biometric templates, and personal data of the individual. The biometric data is raw biometric data obtained from the individual. The biometric data may correspond to any biometric modality desired to be used as a basis of authentication such as, but not limited to, voice, face, finger, iris, palm, and electrocardiogram, and any combination of voice, face, finger, iris, palm, and electrocardiogram. The biometric data may take any form such as, but not limited to, audio recordings, photographs, and videos.

Upon becoming an authorized driver for a ride sharing service, for example, an individual may provide biometric data. Additionally, customers may be required to provide such biometric data before using a ride sharing service, making a hotel reservation, or otherwise conducting an activity. The biometric data for each individual is processed to generate at least one biometric template, for each individual, which may be used to conduct authentication transactions. The biometric data may also be used to conduct authentication transactions. Personal data includes any demographic information regarding an individual including, but not limited to, an individual's name, gender, age, date-of-birth, address, citizenship and marital status. Each data record may also include any kind of data that may be used to authenticate the identity of individuals as described herein.

Although biometric data is obtained from each individual, the biometric authentication data may be obtained by other methods such as, but not limited to, automatically reading or extracting them from identity documents or from legacy databases included in other computer systems. Likewise, biometric templates corresponding to the biometric data may be obtained by other methods such as, but not limited to, automatically reading or extracting the biometric templates from identity documents or from legacy databases included in other computer systems. Templates corresponding to desired biometric data may be obtained in addition to, or instead of, the desired biometric data itself. Such other legacy database systems include, but are not limited to, systems associated with corporate and governmental personnel records, motor vehicle administrations, social security administrations, welfare system administrations, financial institutions and health care providers. Such identity documents include, but are not limited to, passports and driver's licenses.

The AC system 14 may also store configurable authentication policies, some of which may be used to determine authentication data requirements. An authentication data requirement is the authentication data desired to be captured from users during authentication transactions. The authentication data requirement may be any type of authentication data, or any combination of different types of authentication data and may be determined in any manner. The authentication data requirement may also be determined by an individual different than an individual conducting an activity, or by any system (not shown) or device (not shown) configured to communicate with the terminal device 12 and the AC system 14 over the network 16.

The communications network 16 is a 4G communications network. Alternatively, the communications network 16 may be any wireless network including, but not limited to, 3G, Wi-Fi, Global System for Mobile (GSM), Enhanced Data for GSM Evolution (EDGE), and any combination of a LAN, a wide area network (WAN) and the Internet. The network 16 may also be any type of wired network or a combination of wired and wireless networks. The AAC system 10 may also include other devices (not shown) and systems (not shown) able to communicate over the network 16 with the terminal device 12 and the AC system 14. Such other devices (not shown) include other terminal devices and objects configured to communicate over the network 16 with the terminal device 12 and AC system 14. Such objects include, but are not limited to, vehicles equipped to communicate over the network 16. Each of the other terminal devices is typically associated with a different individual. Such other systems (not shown) include other authentication computer systems, ride sharing service computer systems, hotel computer systems, and service provider systems configured to communicate over the network 16 with the terminal device 12 and the AC system 14.

The location of the terminal device 12 and other systems (not shown) and devices (not shown) able to communicate with the terminal devices 12 and the AC system 14 over the network 16 may be given by coordinates derived from the network 16. For example, the location of a vehicle included in the network may be derived from the network 16. Alternatively, global positioning system (GPS) coordinates may be calculated and used to locate a device or system.

The AC system 14 may monitor and track the coordinates of a terminal device 12 associated with a ride sharing service customer during a ride sharing service trip. Doing so, enables the ride sharing service to identify when a customer is not moving towards the destination and empowers the ride sharing service to take corrective action such as contacting the police to stop and check the ride sharing service vehicle. Likewise, if the terminal device 12 cannot be tracked for a period of time, for example, five minutes, while monitoring the location of the terminal device 12 during a trip the ride sharing service may contact the police to stop and check the ride sharing service vehicle to confirm the customer is safe. Alternatively, the coordinates of a terminal device 12 associated with the driver may be monitored and tracked.

Figure 2:
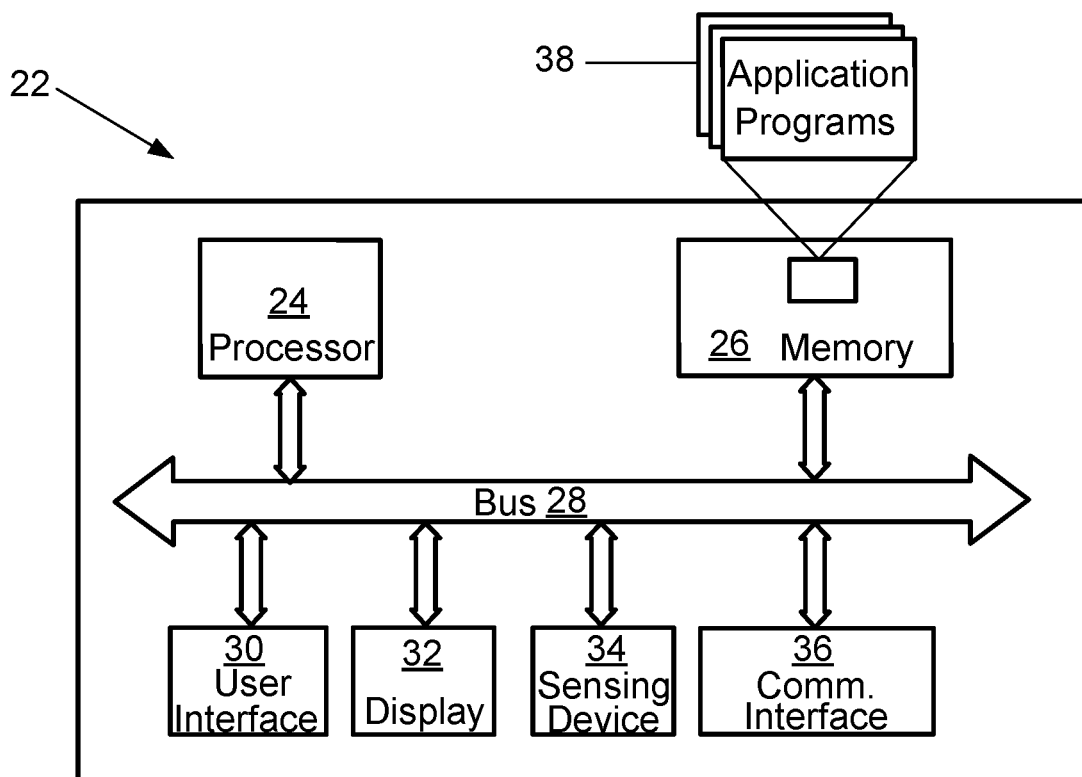
FIG. 2 is a diagram illustrating exemplary components included in a terminal device and an authentication computer system included in the AAC system as shown in FIG. 1.

FIG. 2 is a diagram 22 illustrating exemplary components included in the terminal device 12 and the AC system 14. The terminal device 12 and the AC system 14 may each include one or more processors 24, a memory 26, a bus 28, a user interface 30, a display 32, a sensing device 34 and a communications interface 36.

The processor 24 executes instructions, or computer programs, stored in the memory 26. As used herein, the term processor is not limited to just those integrated circuits referred to in the art as a processor, but broadly refers to a computer, a microcontroller, a microcomputer, a programmable logic controller, an application specific integrated circuit, and any other programmable circuit capable of executing the functions described herein. The above examples are exemplary only, and are thus not intended to limit in any way the definition and/or meaning of the term "processor." General communication between the components in the terminal device 12 is provided via the bus 28.

As used herein, the term "computer program" is intended to encompass an executable program that exists permanently or temporarily on any computer-readable recordable medium that causes the terminal device 12 and/or the AC system 14 to perform at least the functions described herein. Application programs 38, also known as applications, are computer programs stored in the memory 26. Application programs 38 include, but are not limited to, an operating system, an Internet browser application, authentication applications, liveness detection applications, or any special computer program that manages the relationship between application software and any suitable variety of hardware that helps to make-up a computer system or computing environment.

The memory 26 may be a computer-readable recording medium used to store data including, but not limited to, computer programs and data records for the individual, or individuals, associated with the terminal device 12. The memory 26 may be implemented using any appropriate combination of alterable, volatile or non-volatile memory or non-alterable, or fixed, memory. The alterable memory, whether volatile or non-volatile, can be implemented using any one or more of static or dynamic RAM (Random Access Memory), a floppy disc and disc drive, a writeable or re-writeable optical disc and disc drive, a hard drive, flash memory or the like. Similarly, the non-alterable or fixed memory can be implemented using any one or more of ROM (Read-Only Memory), PROM (Programmable Read-Only Memory), EPROM (Erasable Programmable Read-Only Memory), EEPROM (Electrically Erasable Programmable Read-Only Memory), an optical ROM disc, such as a CD-ROM or DVD-ROM disc, and disc drive or the like. Furthermore, the memory 26 may include smart cards, SIMs or any other medium from which a computing device can read computer programs, applications or executable instructions.

The user interface 30 and the display 32 allow interaction between an individual and the terminal device 12 or the AC system 14. The display 32 may include a visual display or monitor that displays information to a user. For example, the display 32 may be a Liquid Crystal Display (LCD), active matrix display, plasma display, or cathode ray tube (CRT). The user interface 30 may include a keypad, a keyboard, a mouse, an infrared light source, a microphone, cameras, and/or speakers. Moreover, the user interface 30 and the display 32 may be integrated into a touch screen display. Accordingly, the display may also be used to show a graphical user interface, which can display various data and provide "forms" that include fields that allow for the entry of information by the user. Touching the screen at locations corresponding to the display of a graphical user interface allows the person to interact with the terminal device 12 to enter data, change settings, control functions, etc. Consequently, when the touch screen is touched, the user interface 30 communicates this change to the processor 24, and settings can be changed or user entered information can be captured and stored in the memory 26.

The sensing device 34 may include Radio Frequency Identification components or systems for receiving information from other devices. The sensing device 34 may also include components with Bluetooth, Near Field Communication (NFC), infrared, or other similar capabilities.

The communications interface 36 provides the terminal device 12 and AC system 14 with two-way data communications. Moreover, the communications interface 36 enables conducting wireless communications such as cellular telephone calls and wirelessly accessing the Internet over the network 16. By way of example, the communications interface 36 may be a digital subscriber line (DSL) card or modem, an integrated services digital network (ISDN) card, a cable modem, or a telephone modem to provide a data communication connection to a corresponding type of telephone line. As another example, the communications interface 36 may be a local area network (LAN) card (e.g., for Ethernet™ or an Asynchronous Transfer Model (ATM) network) to provide a data communication connection to a compatible LAN. As yet another example, the communications interface 36 may be a wire or a cable connecting the terminal device 12 with a LAN, or with accessories such as biometric capture devices. Further, the communications interface 36 may include peripheral interface devices, such as a Universal Serial Bus (USB) interface, a PCMCIA (Personal Computer Memory Card International Association) interface, and the like. Thus, it should be understood that the communications interface 36 may enable conducting any type of wireless or wired communications such as, but not limited to, accessing the Internet over the network 16. Although a single communications interface 36 is included, multiple communication interfaces 36 may alternatively be included.

The communications interface 36 also allows the exchange of information across networks such as the communications network 16. The exchange of information may involve the transmission of radio frequency (RF) signals through an antenna (not shown). Moreover, the exchange of information may be between the terminal device 12, the AC system 14, and any other systems (not shown) and devices (not shown) capable of communicating over the communications network 16.

The methods described herein may be conducted entirely by the terminal device 12, partly on the terminal device 12 and partly on the AC system 14, and partly on the terminal device 12, the AC system 14, and any other devices (not shown) and systems (not shown) able to communicate with the terminal device 12 and the AC system 14 over the network 16. Moreover, data described herein as being stored in the AC system 14 may alternatively be stored in the terminal device 12, or any system (not shown) or device (not shown) configured to communicate with the terminal device 12 and the AC system 14 over the network 16. Likewise, data described herein as being stored in the terminal device 12 may alternatively be stored in the AC system 14, or in any system (not shown) or device (not shown) configured to communicate with the terminal device 12 and the AC system 14 over the network 16.

Figure 3:
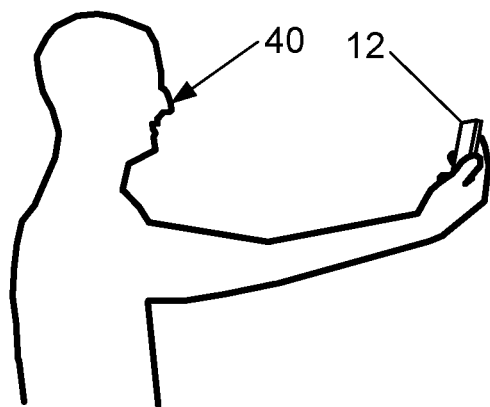
FIG. 3 is a side view of an individual operating the terminal device.

FIG. 3 is a side view of an individual 40 operating the terminal device 12 during an authentication transaction prior to conducting an activity. Specifically, the terminal device 12 and the individual 40 are positioned relative to each other such that the individual may operate the terminal device 12 to capture authentication data from his or her self. Alternatively, a person other than the individual may operate the terminal device 12 to capture authentication data from the individual.

Imposters have been known to impersonate users during remotely conducted network-based biometric authentication transactions by providing a false claim of identity supported by fraudulent biometric data in an effort to deceive an authenticating entity into concluding that the imposter is the person they claim to be. Such impersonations are known as spoofing.

Impostors currently use many methods to obtain or create fraudulent biometric data of others that can be submitted during authentication transactions. For facial biometric data imposters have been known to obtain two-dimensional pictures of others, from social networking sites such as Facebook, which can be presented to a camera during authentication to support a false claim of identity. Imposters have also been known to create fraudulent biometric data by making a physical model of a biometric modality, such as a fingerprint using gelatin or a three-dimensional face using a custom mannequin. Moreover, imposters have been known to eavesdrop on networks during legitimate network-based biometric authentication transactions to surreptitiously obtain legitimate biometric data of users. The imposters then use the obtained biometric data for playback during fraudulent network-based authentication transactions. Such fraudulent biometric data are known to be difficult to detect using known liveness detection methods. Consequently, accurately conducting network-based biometric authentication transactions with biometric data captured from a user at a remote location depends on verifying the physical presence of the user during the authentication transaction as well as accurately verifying the identity of the user with the captured biometric data. Verifying that the biometric data presented during a network-based biometric authentication transaction conducted at a remote location is from a live person at the remote location is known as liveness detection or anti-spoofing.

Figure 4:
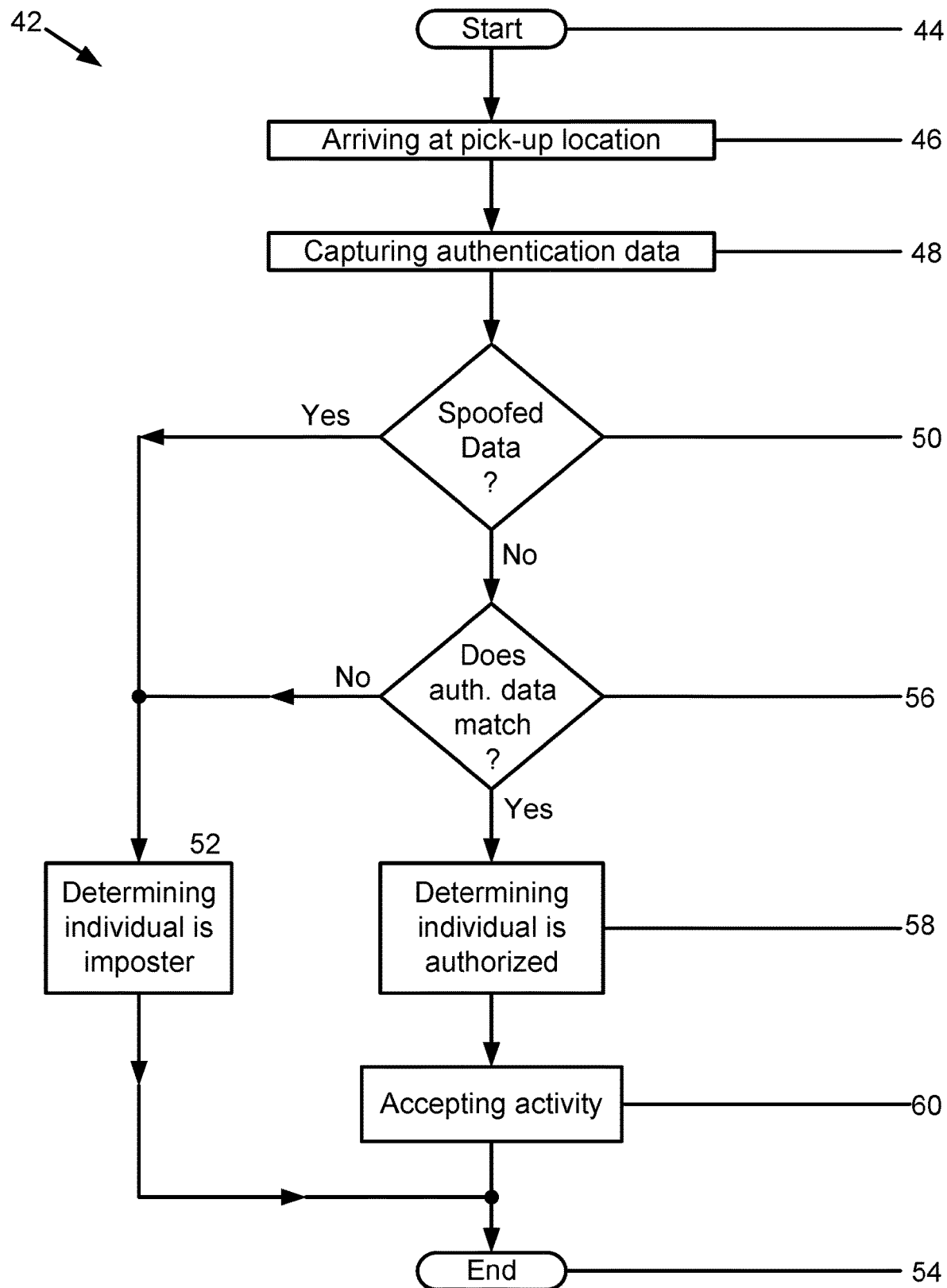
FIG. 4 is a flowchart illustrating an exemplary method for ensuring that an individual is authorized to conduct an activity.

FIG. 4 is a flowchart 42 illustrating an exemplary method for ensuring that an individual is authorized to conduct an activity. In this exemplary method, the activity is driving an automobile as part of a ride sharing service so the individual is a ride sharing service driver. The method starts 44 with a ride sharing service driver arriving 46 at a location to pick-up a customer. After arriving 46 at the location and finding the customer, the driver captures 48 authentication data from his self with his terminal device 12 within view of the customer. The authentication data requirement is face biometric data captured as a photograph.

Next, the customer determines 50 whether the authentication data was spoofed. Because the customer witnesses the driver capturing authentication data from his self, the customer is in a very good position to judge whether the driver provided spoofed authentication data. Additionally, or alternatively, the captured authentication data may be communicated to a different terminal device operated by the customer to provide the customer additional information with which to determine if the driver provided spoofed data. For example, if the photograph received by the different terminal device includes an unshaven individual wearing a fluorescent orange shirt, while the driver is clean shaven and wearing a black shirt, such differences facilitate deciding that the authentication data was spoofed. By the same token, when the details of the captured authentication data match the driver the lack of differences facilitates deciding that the authentication data was legitimate. As another example, the driver may be requested to capture face biometric data from his self as a photograph and to use a selected geographic feature as the background. The geographic feature could be, for example, a building near the location of a waiting customer. The geographic feature is additional information that a customer may use in deciding whether the driver provided spoofed data.

The customer is a person with a highly vested interest in the results of the authentication. Consequently, when the customer decides 50 that the driver used spoofed data the customer immediately realizes the driver very likely is not an authorized ride sharing service driver and strongly suspects that accepting a ride with this driver is dangerous. Thus, the customer continues by determining 52 the driver is an imposter and by refusing to accept a ride, and notifying the ride sharing service operator that an imposter is operating a ride sharing service vehicle. Next, processing ends 54.

However, when the customer decides 50 legitimate authentication data was captured, processing continues by generating a template from the captured authentication data and determining 56 whether the generated biometric template matches the corresponding enrolment biometric template of the driver stored in a data record. When the templates do not match 56, processing continues by determining 52 the driver is an imposter, warning the customer that the driver is an imposter, and warning the customer not to accept the ride. The customer may be warned in any manner including, but not limited to, via a Short Message Service (SMS) message received on his or her terminal device 12 or by an e-mail message sent to his or her e-mail account. Next, processing ends 54. However, when the templates match 56, processing continues by determining the driver is authorized 58 and communicating an SMS or e-mail message to the customer notifying him or her that the driver is legitimate. Next, the customer continues by accepting 60 the ride and processing ends 54.

Although different messages are sent in the exemplary method depending on the authentication transaction result, in alternative methods a message may only be sent when the driver is successfully authenticated. Thus, a customer does not accept the ride until receiving a positive message indicating the driver was successfully authenticated. Such messaging avoids the problem of a delayed warning message, for example in a poor reception area, being mistaken for no warning. Moreover, in alternative exemplary methods the authentication data requirement may be communicated to the terminal devices of the driver and customer at the same time. Doing so enables the customer to further verify that legitimate authentication data is obtained from the driver by ensuring the driver captures authentication data in accordance with the authentication data requirement.

The exemplary embodiment described with regard to the flowchart illustrated in FIG. 4 is the ride sharing business. Although the ride sharing business is the example business described herein, the invention is in no way limited to the ride sharing business and may be used for any business. For example, the invention may also be used to ensure that individuals are authorized to conduct an activity at a hotel.

Such activities include, but are not limited to, staying at the hotel, using the hotel laundry service, ordering room service, or visiting the hotel restaurant. Thus, in alternative exemplary methods conducted in accordance with the flowchart 42 illustrated in FIG. 4, the activity may be staying in a hotel room and the authorized individual may be an individual authorized to stay at the hotel.

In such an alternative method, after arriving 46 at the hotel and finding the front desk, an individual captures authentication data 48 from his self with his terminal device 12 in view of the clerk. The authentication data is face biometric data. The hotel clerk is able to judge 50 whether the authentication data was spoofed. The captured authentication data may be communicated to a terminal device operated by the hotel clerk to provide the clerk with additional information with which to judge whether the authentication data was spoofed. When the hotel clerk decides 50 that the authentication data was spoofed, the hotel clerk determines 52 that the individual is an imposter and refuses to allow the individual to stay at the hotel. Next, processing ends 54.

However, when the hotel clerk decides 50 that legitimate authentication data was captured, processing continues by generating a template from the captured authentication data and determining 56 whether the generated template matches a template included in reservation data for the individual. When the templates do not match 56, the clerk determines 52 the individual is an imposter and refuses to allow the individual to stay at the hotel. However, when the templates match 56, the clerk determines that the individual made the reservation and is authorized 58 to stay at the hotel. Next, processing continues with the individual accepting 60 the room and processing ends 54.

Figure 5:
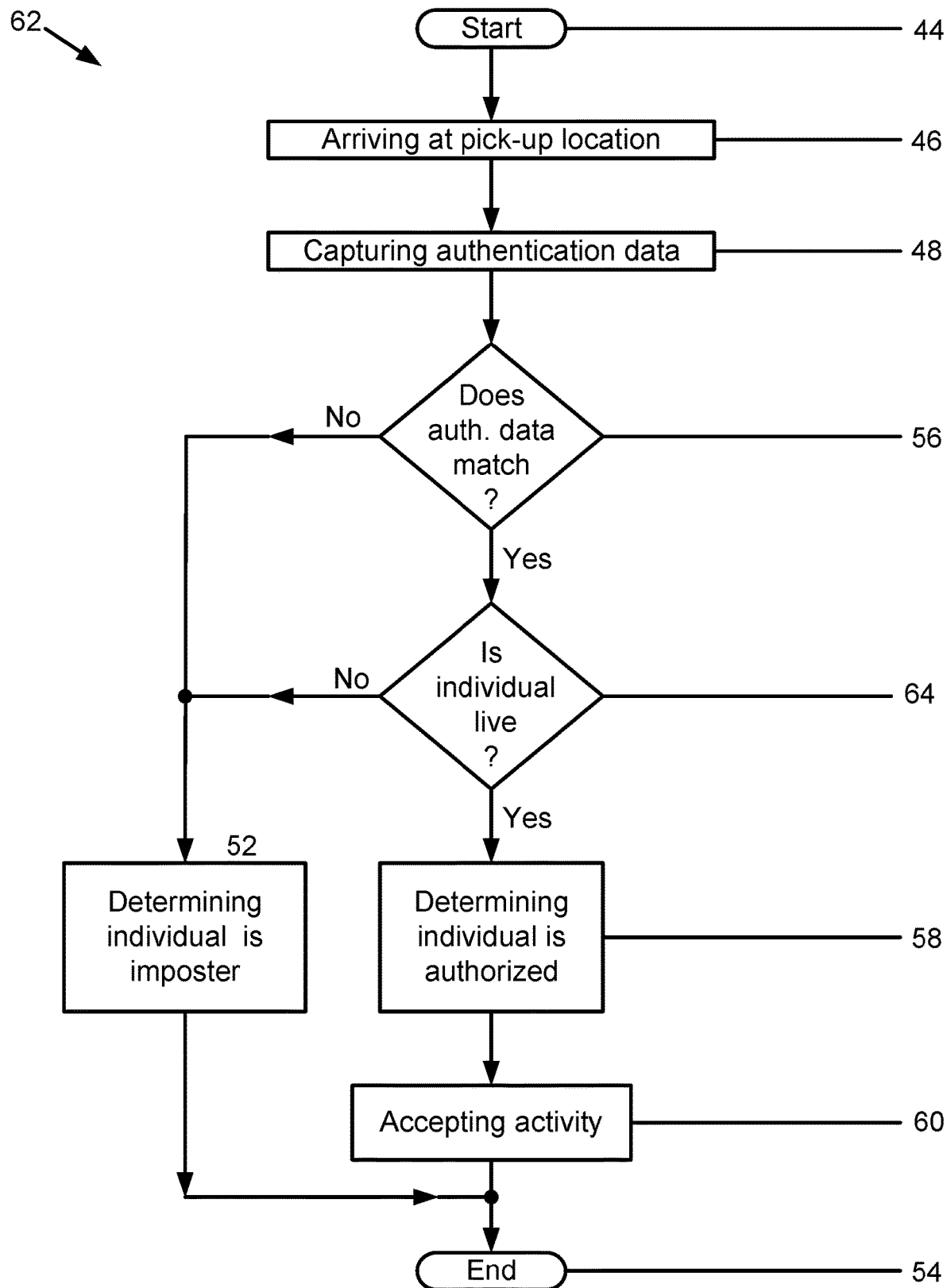
FIG. 5 is a flowchart illustrating an alternative exemplary method for ensuring that an individual is authorized to conduct an activity.

The information shown in FIG. 5 is the same information shown in FIG. 4 as described in more detail below. As such, features illustrated in FIG. 5 that are identical to features illustrated in FIG. 4 are identified using the same reference numerals used in FIG. 4.

FIG. 5 is a flowchart 62 illustrating an alternative exemplary method for ensuring that an individual is authorized to conduct an activity. This alternative method is similar to that shown in FIG. 4 and the activity is driving an automobile as part of a ride sharing service. However, the customer is not in a position to witness the driver capture authentication data from his self. Consequently, in this alternative method, the customer cannot judge whether the driver provides legitimate or spoofed authentication data. As a result, an alternative method of liveness detection is provided based on an authentication data requirement of face biometric data captured as a video.

After successfully authenticating the driver in operation 56, processing continues by determining 64 whether the authentication data was captured from a live person. More specifically, processing continues by processing the captured authentication data for eye blinks. When the captured authentication data does not include an eye blink, processing continues by determining 52 the captured authentication data was spoofed, warning the customer that the driver is an imposter, and warning the customer not to accept the ride. Next, processing ends 54. However, when the captured authentication data includes an eye blink, processing continues by determining the captured authentication data is legitimate 64, and communicating an SMS or e-mail message to the customer notifying him or her that the driver is authorized 58. Next, the customer continues by accepting 60 the ride and processing ends 54.

Figure 6:
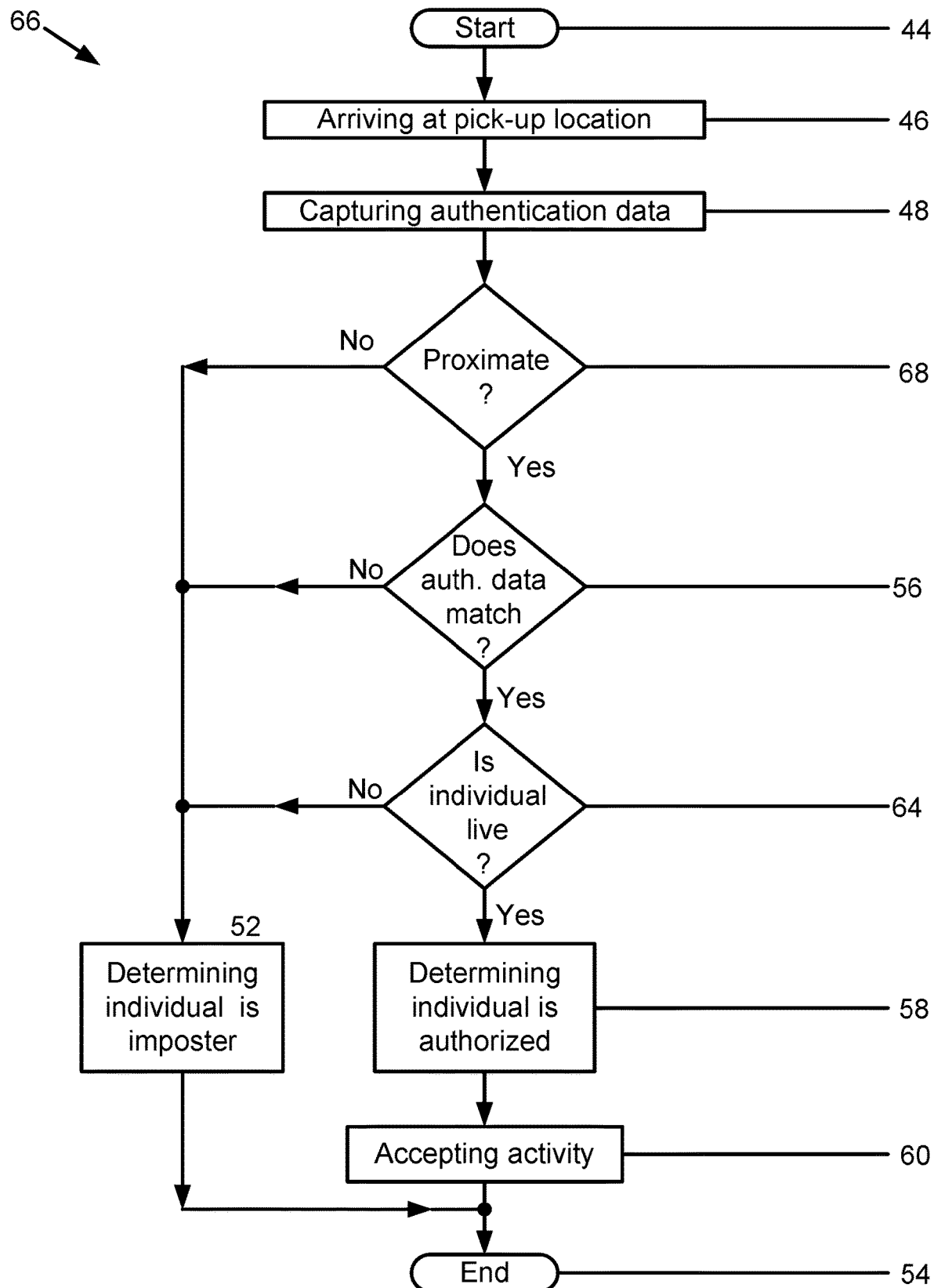
FIG. 6 is a flowchart illustrating another alternative exemplary method for ensuring that an individual is authorized to conduct an activity.

The information shown in FIG. 6 is the same information shown in FIG. 5 as described in more detail below. As such, features illustrated in FIG. 6 that are identical to features illustrated in FIG. 5 are identified using the same reference numerals used in FIG. 5.

FIG. 6 is a flowchart 66 illustrating another alternative exemplary method for ensuring that an individual is authorized to conduct an activity. This alternative method is similar to that shown in FIG. 5. However, after capturing authentication data 48 with the terminal device 12, processing continues by determining 68 whether the ride sharing vehicle and the terminal device 12 are proximate each other. Determining that a ride sharing service vehicle is proximate the terminal device 12 of a driver is additional evidence that may be used to show a driver is authorized to drive the vehicle. The vehicle and terminal device 12 not being proximate each other may indicate that an unauthorized ride sharing vehicle is being used or that the terminal device 12 is not in the vehicle with the driver, which may evidence collusion between drivers. Thus, determining proximity facilitates reducing collusion between drivers.

More specifically, after capturing authentication data 48, processing continues by calculating location coordinates of the vehicle and of the terminal device 12 of the driver, and calculating the distance between the coordinates. If the vehicle and the terminal device 12 are within a threshold distance of each other, for example, five feet, the vehicle and terminal device 12 are determined to be proximate each other. Next, processing continues by conducting operation 56. The threshold distance may be any distance that facilitates establishing the vehicle and terminal device 12 are proximate each other. However, when the vehicle and the terminal device 12 are not within the threshold distance they are not proximate each other. As a result, processing continues by determining 52 that the individual driving the vehicle is an imposter, warning the customer that the driver is an imposter, and warning the customer not to accept the ride. Next, processing ends 54.

Most ride sharing service customers have terminal devices. Consequently, although the alternative exemplary method described with regard to FIG. 6 determines the proximity between the vehicle and the terminal device 12 of the driver, the proximity of the terminal device 12 of the driver to a terminal device of a customer may alternatively, or additionally, be determined. Doing so also facilitates reducing collusion between drivers.

Although the authentication data requirement for the flowcharts illustrated in FIGS. 5 and 6 is face biometric data captured as a video, the authentication data requirement may alternatively be any data that may be used to authenticate individuals. Moreover, although liveness detection is based on eye-blink detection techniques, it should be understood that other liveness detection techniques compatible with the authentication data requirement may be used. Such other face liveness techniques include, but are not limited to, head nods, head shakes, illumination characteristics, eye movements, smile, eye brow movements, and face texture.

Individuals authorized to conduct an activity, and more particularly, unauthorized individuals, may figure out how to spoof an authentication system using the terminal device 12, and may be able to do so in the presence of an unwitting customer. Consequently, in other alternative exemplary methods, the customer may capture authentication data from the driver—instead of the driver. In such alternative exemplary methods, after the driver arrives at a location and finds the customer, the customer captures authentication data from the driver. The customer uses his or her own terminal device

12 to capture the authentication data. Having the customer capture authentication data from the driver facilitates reducing collusion between drivers and any dangers that may result therefrom.

When the customer captures the authentication data, the authentication data requirement may be determined by the customer. Alternatively, the ride sharing service may create different levels of authentication that may be used by customers during authentication transactions. For example, the different levels of authentication may be high, medium, and low. The high level of authentication may require authentication based on two different biometric modalities, for example, face and voice. The medium level of authentication may require authentication based on one biometric modality, for example, iris. Moreover, the high and medium levels of authentication may be coupled with methods of liveness detection based on the corresponding biometric modalities for further security. The low level of authentication may require authentication based on one biometric modality, for example, face, without liveness detection. It should be understood that the different levels of authentication may be defined to include any biometric modalities, and may be coupled with any liveness detection techniques desired by the ride sharing service.

Customers may be able to choose a default authentication level upon signing-up for the ride sharing service, and the chosen authentication level may be established as the default for the terminal device 12 of the customer. When capturing authentication data from the driver, the customer operates his or her terminal device 12 such that biometric data in accordance with the default authentication level is captured. However, there may be times, such as late at night, when a customer prefers to use a more rigorous standard. Consequently, the customer may alternatively change the default level to an authentication level more suitable to the circumstances existing during an authentication transaction. For example, a customer may change a low authentication default level by selecting to capture authentication data according to the high authentication level.

Customers may also capture authentication data from the driver after arriving at the destination but before paying the fare. An indication of the successful authentication result may be included in a receipt provided to the customer. Moreover, successfully authenticating the driver at the destination is proof that the driver was not replaced by another driver during the trip.

In addition to being authenticated prior to conducting an activity, an individual may be prompted to authenticate while conducting the activity, perhaps repeatedly, in subsequent authentication transactions. Subsequent authentication transactions may occur at random or at periodic times after a previous successful authentication transaction. The times may be determined in any manner including, but not limited to, at a periodic time interval, based on data collected during previous authentications of an individual, and by a characteristic related to the activity.

Data collected during previous authentication transactions of an individual may be analyzed to determine the times and/or locations of authentication transactions that did not yield satisfactory results. Consequently, times corresponding to the unsatisfactory results may be used to determine when the subsequent transactions occur. For example, if an unsatisfactory result was obtained at 2:30 PM on a Thursday afternoon, the same time and day may be used as the time of a subsequent transaction. Alternatively, the time that the individual is at the location of an unsatisfactory authentication may determine when to conduct a subsequent authentication transaction. For example, if an unsatisfactory result was obtained while the user was located at the main square in a town, the individual may be required to conduct a subsequent authentication transaction whenever he or she is in the main square.

The timing of a subsequent authentication transaction may also be determined by a characteristic related to the activity. When driving a vehicle as part of a ride sharing service is the activity, related characteristics include, but are not limited to, miles driven, the number of customers served, the number of trips to the same location, and the beginning and ending times of a trip. Thus, drivers operating vehicles as part of a ride sharing service may be prompted to authenticate after driving a certain number of miles. Because the location of the ride sharing service vehicle may be calculated using network 16 related techniques, the distance driven may be quickly and easily calculated. Moreover, when the distance of a trip is longer or shorter than expected, such an event may trigger a subsequent authentication transaction. Furthermore, subsequent authentication transactions may be conducted at times chosen by the customer, or at the beginning and ending time of a trip.

Moreover, subsequent authentication transactions may be conducted more frequently for some individuals than for others. It is known that customers may rate ride sharing service drivers on a number of factors. The ratings data for each driver may be analyzed to calculate an overall rating and a series of different specific ratings for each driver. Drivers having a high overall rating may be required to conduct subsequent authentication transactions less frequently than lower rated drivers, for example, every 4 hours instead of every 2 hours. Moreover, drivers may be required to conduct subsequent authentication transactions in accordance with a specific ratings score. For example, drivers who have a high friendly rating score may be required to conduct fewer subsequent authentication transactions versus drivers having low friendly rating scores.

The authentication data requirement for each subsequent authentication transaction may be the same or different. Different requirements are typically more difficult to spoof and thus discourage collusion between authorized and unauthorized individuals. Moreover, the authentication data requirement may become progressively more rigorous the longer an individual conducts an activity. For example, the requirement may be face, face and voice, and iris, respectively, at two, four, and six hours after an initial successful authentication transaction.

Figure 7:
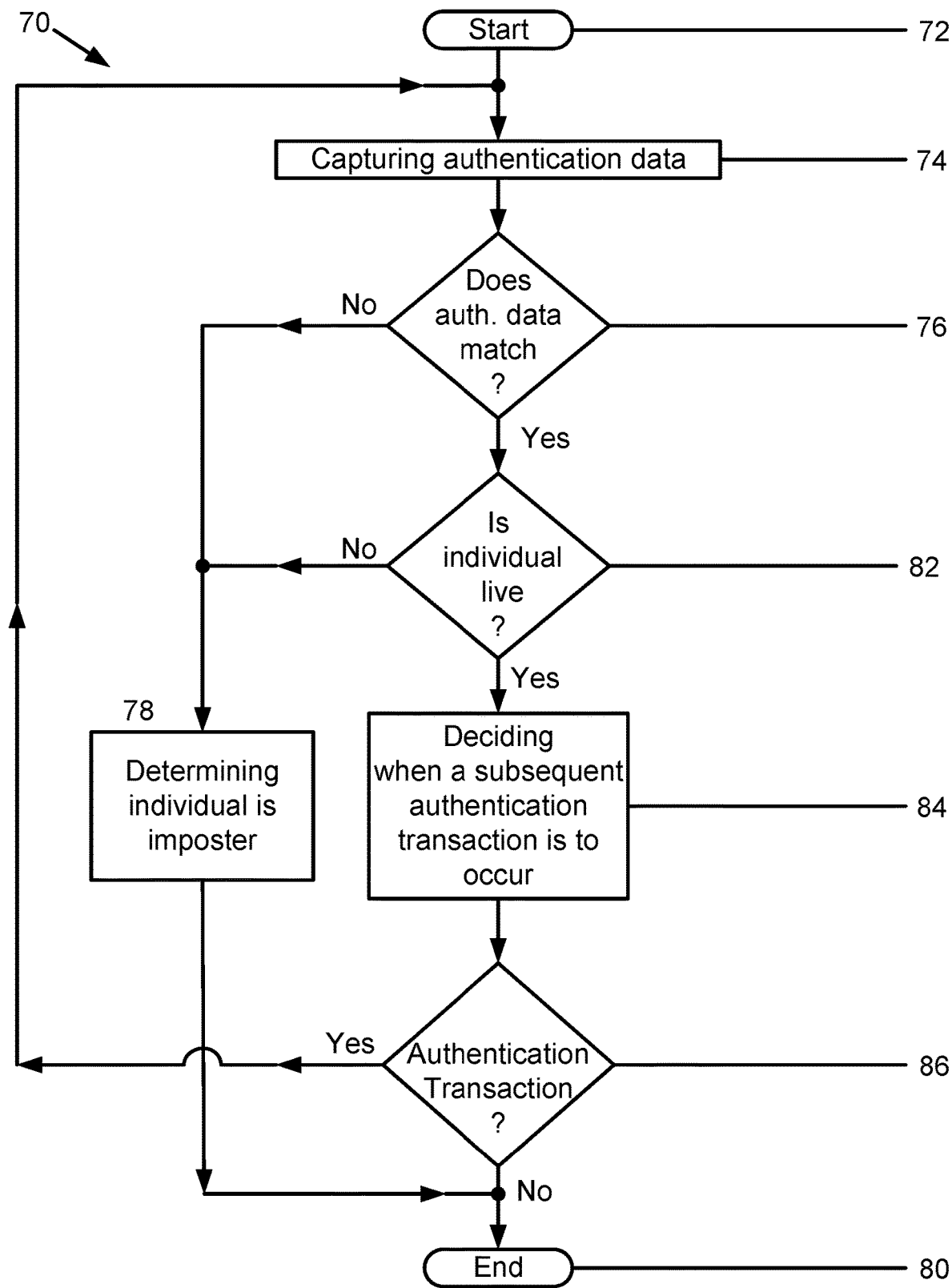
FIG. 7 is a flowchart illustrating yet another alternative exemplary method for ensuring that an individual is authorized to conduct an activity.

FIG. 7 is a flowchart 70 illustrating yet another exemplary method for ensuring that an individual is authorized to conduct an activity. For the AC system 10, the method starts 72 with an individual desiring to conduct an activity capturing 74 authentication data from his or her self with the terminal device 12. A template is generated from the captured authentication data. In this exemplary method, the activity is driving an automobile as part of a ride sharing service and the authentication data is face biometric data captured as a video.

Next, processing continues by determining 76 whether the generated biometric template matches the corresponding biometric template stored in the data record of the individual. When the templates do not match, processing continues by determining 78 the individual is an imposter and notifying the authorized individual associated with the terminal device 12 about the imposter. Next, processing ends 80. However, when the templates match 76, processing continues by determining 82 whether the authentication data was captured from a live individual. More specifically, processing continues by checking the captured authentication data for eye blinks. When the captured authentication data does not include an eye blink, the captured authentication data was spoofed. Consequently, processing continues by determining 78 the individual is an imposter and notifying the authorized individual associated with the terminal device 12 about the imposter. Next, processing ends 80.

However, when the captured authentication data includes an eye blink, the captured authentication data is considered legitimate, the individual is authorized to conduct the transaction and processing continues by deciding 84 when a subsequent authentication transaction is to occur. Next, processing continues by determining 86 whether it is time to conduct a subsequent transaction. If so, processing continues by capturing authentication data 74. When the driver indicates that he is ending the shift, a subsequent transaction is not conducted 86, and processing ends 80.

Using the terminal device 12 to capture face biometric data from a driver while operating a vehicle may be dangerous to the driver, customers, and other vehicles. Consequently, the authentication data requirement for authentication transactions may alternatively be tailored to the status of the vehicle at the time of an authentication transaction. For example, the authentication data requirement may be based on the speed of the vehicle. When the vehicle is travelling between zero and five miles per hour, which is characteristic of travelling in stop and go traffic, the authentication data requirement may be for face biometric data or any other type biometric data that may be captured without undue safety concerns. However, at higher speeds, such as over twenty-five miles per hour the authentication data requirement may be for voice only. For example, the driver may be prompted to speak the name of the customer.

In yet other alternative exemplary methods, customers may be required to approve the successful authentication of a driver. For example, after a driver is determined to be authorized, the terminal device of the customer may display a tick-box for the customer to check and thus approve the successful result. Alternatively, successful authentication of the customer may be required for the customer to approve the successful result. For such an authentication transaction, the customer uses his or her terminal device to capture authentication data from his or her self in accordance with an authentication data requirement, and upon a match between the captured data and record data of the customer, the customer is successfully authenticated. The successful authentication result constitutes automatic customer approval. The driver may capture the authentication data, with his own terminal device or the terminal device of the customer, from the customer, instead of the customer capturing his or her own authentication data.

The alternative exemplary embodiment described with regard to the flowchart illustrated in FIG. 7 is the ride sharing business. However, in another alternative exemplary method conducted in accordance with the flowchart 70 illustrated in FIG. 7, the activity may be remotely making a reservation at a hotel restaurant and the individual may be a patron authorized to stay at the hotel.

Such an alternative exemplary method starts 72 with the patron desiring to conduct the activity capturing 74 authentication data from his or her self with the terminal device 12. A template is generated from the captured authentication data. In this alternative exemplary method, the authentication data is face biometric data captured as a video.

Next, processing continues by determining 76 whether the generated biometric template matches a corresponding biometric template of the patron. The biometric template of the patron may have been generated when the patron reserved his room or when the patron checked-into the hotel. When the templates do not match 76, processing continues by determining 78 the patron is an imposter and refusing to let the patron to make a restaurant reservation. Next, processing ends 80. However, when the templates match 76, processing continues by determining 82 whether the authentication data was captured from a live individual. More specifically, processing continues by checking the captured authentication data for eye blinks. When the captured authentication data does not include an eye blink, the captured authentication data was spoofed. Consequently, processing continues by determining 78 the patron is an imposter and refusing to let the patron make a restaurant reservation. Next, processing ends 80.

However, when the captured authentication data includes an eye blink the captured authentication data is considered legitimate. As a result, the individual is authorized to conduct the transaction and processing continues by deciding 84 when a subsequent authentication transaction is to occur. In this alternative exemplary method, the subsequent authentication transaction occurs when the hotel patron arrives at the restaurant. Next, processing continues by determining 86 whether it is time to conduct a subsequent transaction. When the patron arrives at the hotel, processing continues by capturing authentication data 74. Otherwise, if a subsequent transaction is not to occur 86, processing ends 80.

Although an individual conducting an activity is subject to authentication as described herein, it should be understood that individuals who benefit from such activity may also, or alternatively, be authenticated using the same methods described herein. For example, some ride sharing service customers may be unruly or otherwise dangerous and place drivers in peril.

In each embodiment, the above-described methods and systems for ensuring an authorized individual is conducting an activity facilitate detecting collusion between individuals authorized to conduct an activity and unauthorized individuals. As a result, in each embodiment, the above-described methods facilitate reducing risks that unauthorized individuals will conduct activities, and thus facilitates reducing the legal liabilities and costs resulting from collusion. Moreover, the above-described methods facilitate enhancing customer safety.

More specifically, an individual desiring to conduct an activity captures authentication data from his or her self. Alternatively, another person may capture authentication data from the individual. The captured authentication data is compared against corresponding record data of the individual to determine whether there is a match. When the captured and record data match, the individual is successfully authenticated. Otherwise, the individual is not successfully authenticated and cannot conduct the activity. When the individual is successfully authenticated, the captured authentication data is checked to determine if the captured authentication data is legitimate. When the captured data is considered to be legitimate, the individual is permitted to conduct the activity. Otherwise, the captured authentication data is considered fraudulent, and the individual is considered to be an imposter and is not permitted to conduct the activity. When an individual is not successfully authenticated or the captured authentication data is deemed fraudulent in a subsequent authentication transaction, the individual is considered to be an imposter. Moreover, the authorized individual who was earlier successfully authenticated is considered to have colluded with an unauthorized individual. Consequently, the authorized status of the authorized individual is revoked.

The exemplary embodiments of methods for ensuring an authorized individual is conducting an activity described above should not be considered to imply a fixed order for performing the process steps. Rather, the process steps may be performed in any order that is practicable, including simultaneous performance of at least some steps. Moreover, the methods are not limited to use with the specific computer systems described herein, but rather, the methods can be utilized independently and separately from other computer components described herein. Furthermore, the invention is not limited to the embodiments of the methods described above in detail. Rather, other variations of the methods may be utilized within the spirit and scope of the claims.

What is claimed is:

1. A method for ensuring an individual is authorized to operate a vehicle comprising the steps of:
    after successfully authenticating the identity of the individual during an authentication transaction based on biometric data, determining, by a processor, whether the biometric data is of a live person;
    when the biometric data is of a live person, determining, by the processor, the individual is authorized to operate the vehicle; and
    conducting, by the processor, at least one subsequent authentication transaction based on biometric data of the individual captured while the individual operates the vehicle, the biometric data to be captured being determined based on the speed of the vehicle.

2. A method in accordance with claim 1, the vehicle being operated as part of a ride sharing service, the method further comprising the steps of:
    tracking, by the processor, the coordinates of a terminal device associated with a ride sharing service customer; and
    contacting police to stop and check the ride sharing service vehicle when the coordinates are not moving towards a destination.

3. A method in accordance with claim 1, the vehicle being operated as part of a ride sharing service, the method further comprising the steps of:
    tracking, by the processor, the coordinates of a terminal device associated with a ride sharing service customer; and
    contacting police to stop and check the ride sharing service vehicle when the customer terminal device coordinates cannot be tracked for a period of time.

4. A method in accordance with claim 1, the vehicle being operated as part of a ride sharing service, the method further comprising the step of capturing face biometric data of the individual for the at least one subsequent authentication transaction.

5. A method in accordance with claim 1, the vehicle being operated as part of a ride sharing service, the method further comprising the steps of:
    receiving, by a terminal device associated with a ride sharing service customer, a message indicating the individual was successfully authenticated; and
    accepting, by the ride sharing service customer, a ride after receiving the message.

6. A method in accordance with claim 1, the vehicle being operated as part of a ride sharing service, the method further comprising the step of capturing voice biometric data of the individual, or biometric data for any combination of biometric modalities of the individual, for the at least one subsequent authentication transaction.

7. A computer system for ensuring an individual is authorized to operate a vehicle comprising:
    a processor; and
    a memory configured to store data, said computer system being associated with a network and said memory being in communication with said processor and having instructions stored thereon which, when read and executed by said processor cause said computer system to perform steps comprising:
    after successfully authenticating the identity of the individual during an authentication transaction based on biometric data, determining whether the biometric data is of a live person;
    when the biometric data is of a live person, determining the individual is authorized to operate the vehicle; and
    conducting at least one subsequent authentication transaction based on biometric data of the individual captured while the individual operates the vehicle, the biometric data to be captured being determined based on the speed of the vehicle.

8. A computer system in accordance with claim 7, wherein the instructions which when read and executed by said processor further cause said computer system to perform steps comprising:
    tracking the coordinates of a terminal device associated with a ride sharing service customer; and
    contacting police to stop and check the vehicle when the coordinates are not moving towards a destination, the vehicle being operated as part of the ride sharing service.

9. A computer system in accordance with claim 7, wherein the instructions which when read and executed by said processor further cause said computer system to perform steps comprising:
    tracking the coordinates of a terminal device associated with a ride sharing service customer; and
    contacting police to stop and check the vehicle when the customer terminal device coordinates cannot be tracked for a period of time, the vehicle being operated as part of the ride sharing service.

10. A computer system in accordance with claim 7, wherein the instructions which when read and executed by said processor further cause said computer system to perform steps comprising capturing face biometric data of the individual for the at least one subsequent authentication transaction.

11. A computer system in accordance with claim 7, wherein the instructions which when read and executed by said processor further cause said computer system to perform steps comprising transmitting a message indicating the individual was successfully authenticated.

12. A computer system in accordance with claim 7, wherein the instructions which when read and executed by said processor further cause said computer system to perform steps comprising capturing voice biometric data of the individual, or biometric data for any combination of biometric modalities of the individual, for the at least one subsequent authentication transaction.

13. A non-transitory computer-readable recording medium having a computer program recorded thereon for ensuring an individual is authorized to operate a vehicle, the computer program being comprised of instructions, which when read and executed by a processor cause the processor to:

after successfully authenticating the identity of the individual during an authentication transaction based on biometric data, determine whether the biometric data is of a live person;

when the biometric data is of a live person, determine the individual is authorized to operate the vehicle; and conduct at least one subsequent authentication transaction based on biometric data of the individual captured while the individual operates the vehicle, the biometric data to be captured being determined based on the speed of the vehicle.

14. A non-transitory computer-readable recording medium having a computer program recorded thereon for ensuring an individual is authorized to operate a vehicle in accordance with claim 13, wherein the instructions, when read and executed by the processor cause the processor to:

track the coordinates of a terminal device associated with a ride sharing service customer; and contact police to stop and check the vehicle when the coordinates are not moving towards a destination, the vehicle being operated as part of the ride sharing service.

15. A non-transitory computer-readable recording medium having a computer program recorded thereon for ensuring an individual is authorized to operate a vehicle in accordance with claim 13, wherein the instructions, when read and executed by the processor cause the processor to:

track the coordinates of a terminal device associated with a ride sharing service customer; and contact police to stop and check the vehicle when the terminal device coordinates cannot be tracked for a period of time, the vehicle being operated as part of the ride sharing service.

16. A non-transitory computer-readable recording medium having a computer program recorded thereon for ensuring an individual is authorized to operate a vehicle in accordance with claim 13, wherein the instructions, when read and executed by the processor cause the processor to determine that face biometric data of the individual is to be captured for the at least one sub sequent authentication transaction.

17. A non-transitory computer-readable recording medium having a computer program recorded thereon for ensuring an individual is authorized to operate a vehicle in accordance with claim 13, wherein the instructions, when read and executed by the processor cause the processor to transmit a message indicating the individual was successfully authenticated.

18. A non-transitory computer-readable recording medium having a computer program recorded thereon for ensuring an individual is authorized to operate a vehicle in accordance with claim 13, wherein the instructions, when read and executed by the processor cause the processor to determine that voice biometric data of the individual, or biometric data for any combination of biometric modalities of the individual, is to be captured for the at least one subsequent authentication transaction.

\* \* \* \* \*